United States Patent [19]

Simmons, Jr.

[11] 4,261,284
[45] Apr. 14, 1981

[54] SEA HUNT SYSTEM

[75] Inventor: James V. Simmons, Jr., Kaneohe, Hi.

[73] Assignee: The United States of America as represented by the Secretary of the Navy, Washington, D.C.

[21] Appl. No.: 66,220

[22] Filed: Aug. 13, 1979

[51] Int. Cl.³ .................... G01D 21/00; B64C 27/04
[52] U.S. Cl. ................................ 116/209; 244/17.11
[58] Field of Search ............ 116/209; 244/3.15, 17.11, 244/3.16, 129.5, 129.3; 343/18 A; 89/1 R, 37.5 R, 37.5 D

[56] References Cited

U.S. PATENT DOCUMENTS

| 1,056,503 | 3/1913 | Cooper | 89/37.5 R |
|---|---|---|---|
| 2,517,509 | 8/1950 | Sikorsky | 244/17.11 |
| 3,259,345 | 7/1966 | Martignoni et al. | 244/129.3 |
| 3,421,721 | 1/1969 | Miller | 244/129.5 |
| 4,022,054 | 5/1977 | Biederman | 116/202 X |

FOREIGN PATENT DOCUMENTS 1403120 8/1975 United Kingdom .................... 116/209

OTHER PUBLICATIONS

Publication "Animal Guidance System", by L. G. Lawrence Electronics World, Dec. 1971, (pp. 27-29, 50).

Primary Examiner—Daniel M. Yasich
Attorney, Agent, or Firm—Richard S. Sciascia; Ervin F. Johnston

[57] ABSTRACT

A search apparatus is provided for an aircraft. The search apparatus includes a transparent observation chamber and a plurality of bulkheads which divide the chamber into at least two compartments. A cradle is mounted within each compartment for supporting a bird with the head of the bird facing outwardly with respect to the chamber. A peck key is mounted in each chamber in proximity to the outward end of the cradle, and a tray is provided for containing food for the bird. A device is mounted within each compartment for sliding the tray inwardly or outwardly, the outward position being adapted to present food to the bird and the inward position being adapted to withdraw food from the bird. Indicators may be connected to the peck keys for indicating which bird in a chamber has visual contact with an object, and a control device may be provided for selectively actuating the food trays for the inward and outward movements.

13 Claims, 10 Drawing Figures

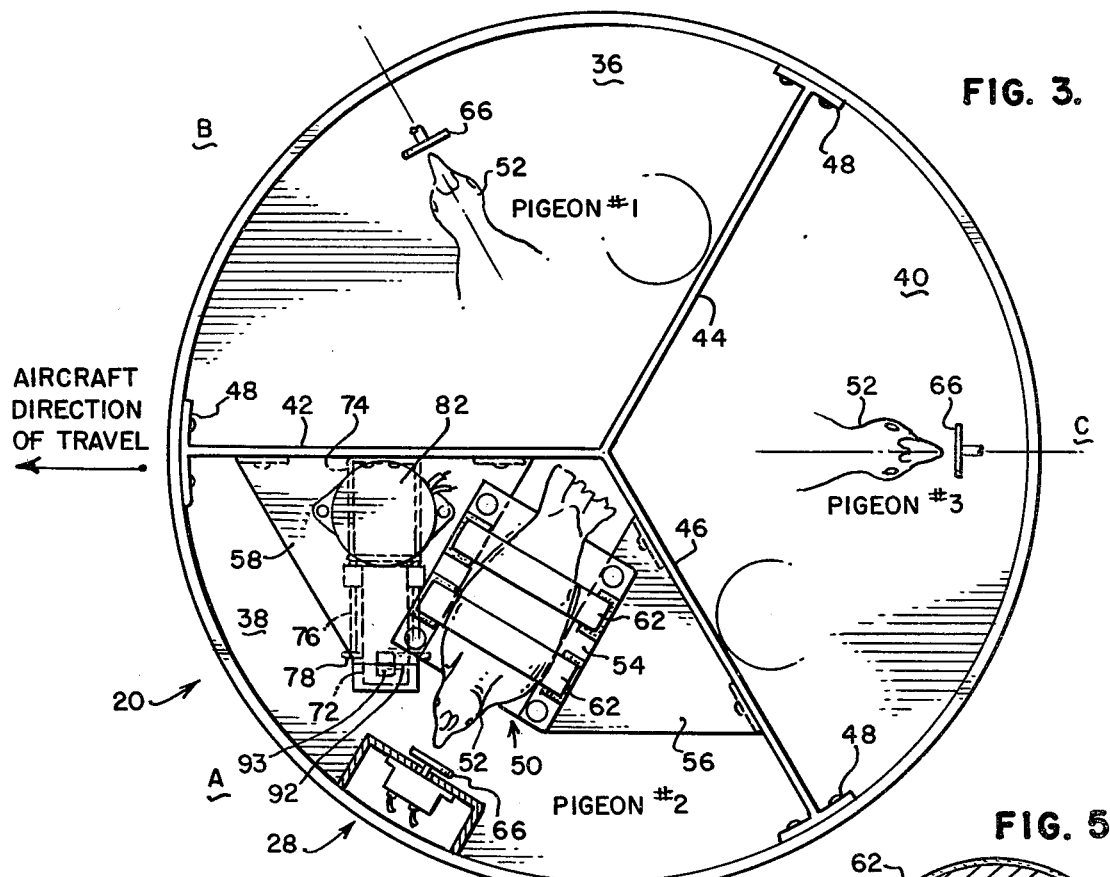
FIG. 3.
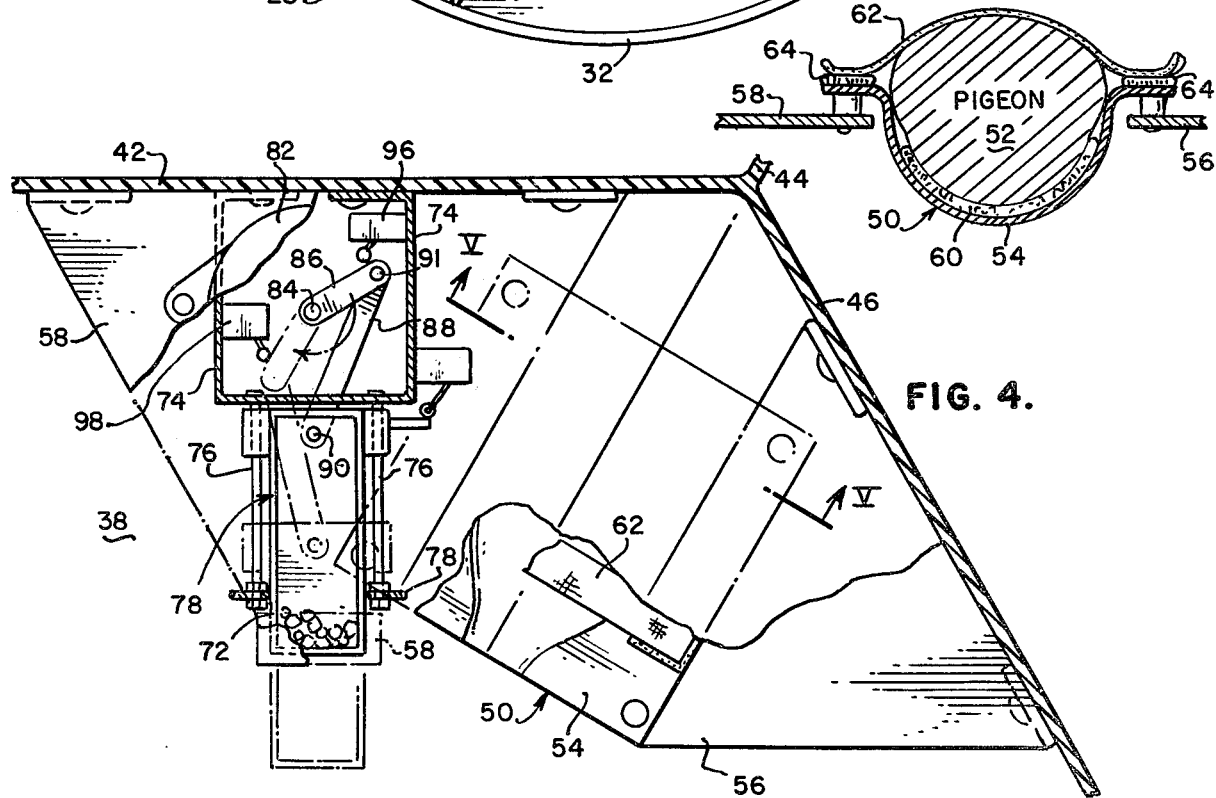
FIG. 5.
FIG. 4.

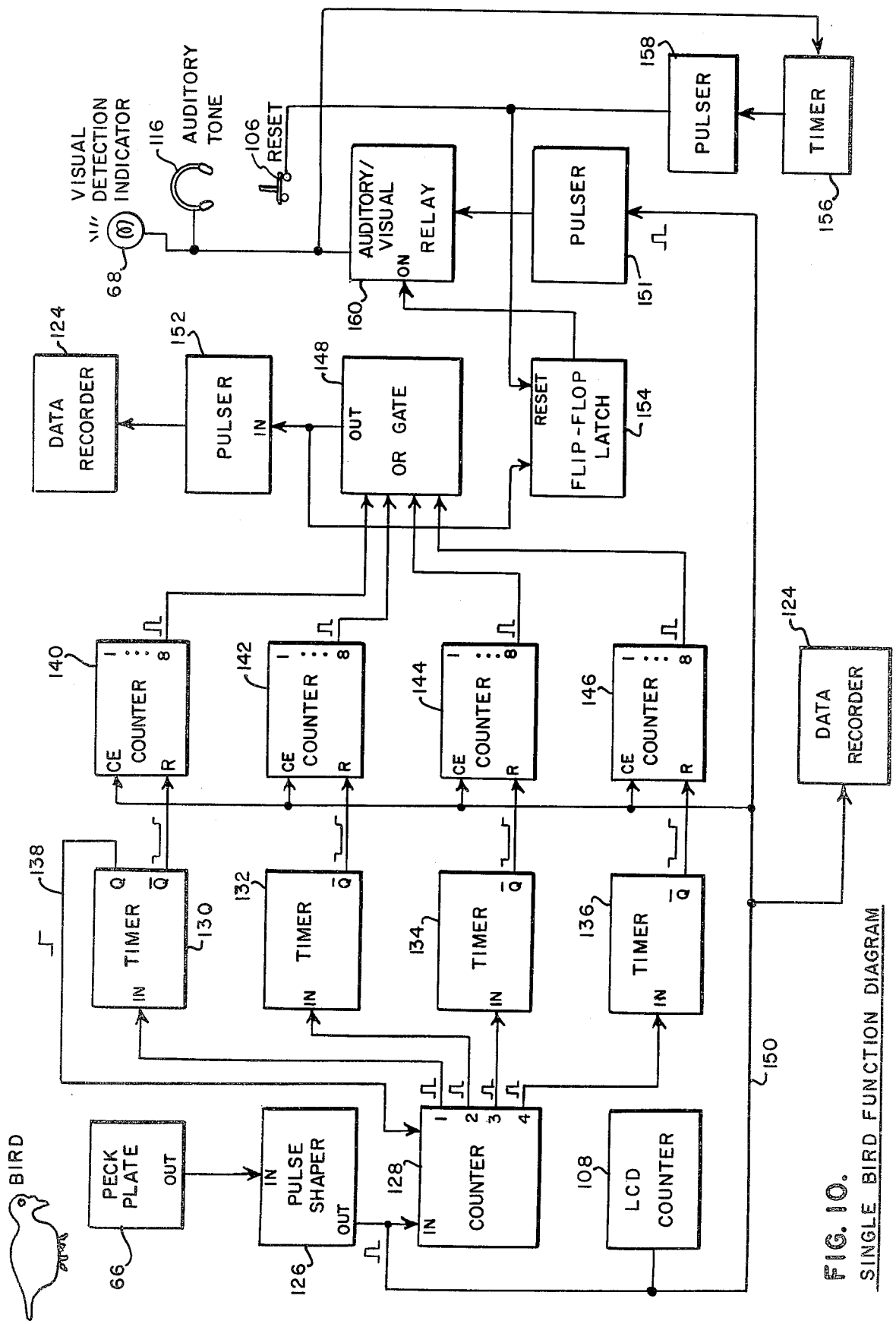
FIG. 10. SINGLE BIRD FUNCTION DIAGRAM

SEA HUNT SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

One of the most helpless feelings is being lost at sea. The accepted method of searching for a person lost at sea is to utilize as many aircraft as possible with human lookouts. These aircraft, many of which are helicopters, undertake a pattern of search which is hopefully in the area of the lost person. The procedure is the same for lost objects, such as instrumentation which is lost overboard or unmoored from an anchor. The performance of the human observer is dependent upon many conditions, such as: state of training of the observer, his alertness, his incentive and fatigue level, the suitability of the lookout position, interference with other duties, sun angle, weather, flight speed and altitude, and size, color and behavior of the lost object or person. In spite of the training which is undertaken to optimize the human observers capabilities, his main impediment is the capability of his eyes. Many birds have eyes which are much superior to a human's eyes. Birds eyes enable them to identify dangerous prey or articles of food at great distance for survival purposes. Prior work to utilize the eyes of a pigeon was undertaken by Skinner during and subsequent to World War II. Skinner's research involved utilizing a trained pigeon in a transparent nose-cone of a missile for guiding the missile to a target. There is no known research utilizing a bird, such as a pigeon for search purposes.

SUMMARY OF THE INVENTION

The present invention provides a search apparatus which utilizes birds, such as pigeons, for searching for lost persons or objects from an aircraft. This has been accomplished by providing a transparent observation chamber which can be mounted to the bottom of the aircraft. A plurality of bulkheads divide the chamber into at least two compartments, and a cradle is mounted within each compartment for supporting a bird with the head of the bird facing outwardly with respect to the chamber. A peck key is mounted in each chamber in proximity to the outward end of the cradle, and a tray is provided for containing food for the bird. A device is mounted within each compartment for sliding the food tray inwardly or outwardly, the outward position being adapted to present food to the bird and the inward position being adapted to withdraw food from the bird. Indicators may be connected to the peck keys, and a control device may be provided for selectively actuating the food trays inwardly or outwardly. The indicators and the control device may be mounted within the aircraft for a human operator.

OBJECTS OF THE INVENTION

An object of the present invention is to provide an apparatus which utilizes birds for searching for lost persons or objects.

Another object is to provide an apparatus which will contain pigeons and which can be mounted on an aircraft for searching for persons or objects lost at sea.

A further object is to provide a relatively low cost aircraft mounted apparatus which will enable increased probability of detection of lost persons or objects on the earth's surface.

These and other objects of the invention will become more readily apparent from the ensuing specification when taken together with the drawings.

DESCRIPTION OF THE DRAWINGS

FIG. 3 is a plan view looking down on the search apparatus along plane III—III of FIG. 2.

FIG. 4 is an enlarged plan view of the lower left compartment of FIG. 3 with portions broken away to illustrate various components thereof.

FIG. 5 is a view taken along plane V—V of FIG. 4.

FIG. 10 is a schematic block diagram of the circuitry for implementing the logic of FIG. 8 for one bird.

DESCRIPTION OF THE PREFERRED EMBODIMENTS

Figure 1:
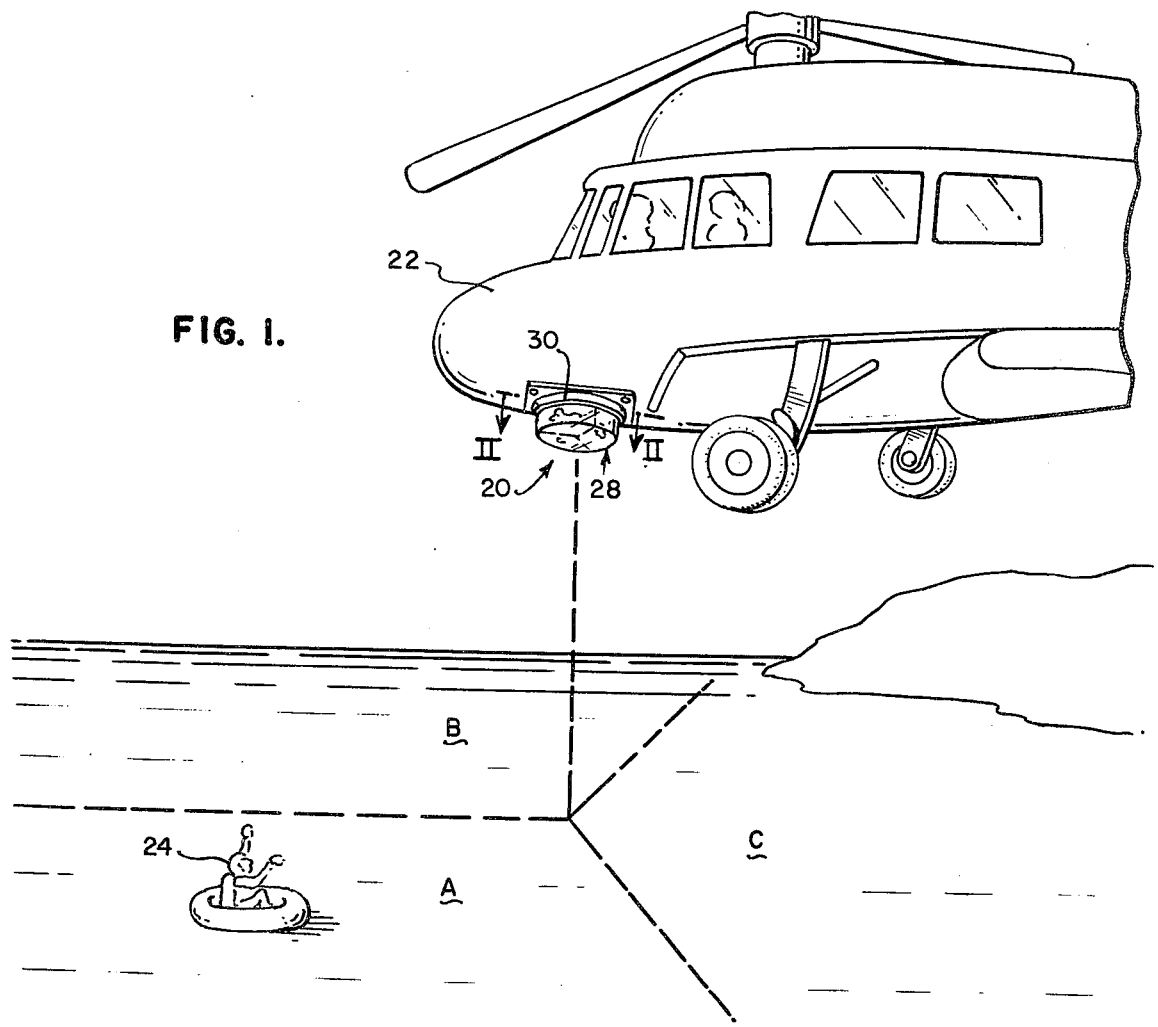
FIG. 1 is a perspective view of an aircraft utilizing the search apparatus for locating a lost person at sea.
Figure 2:
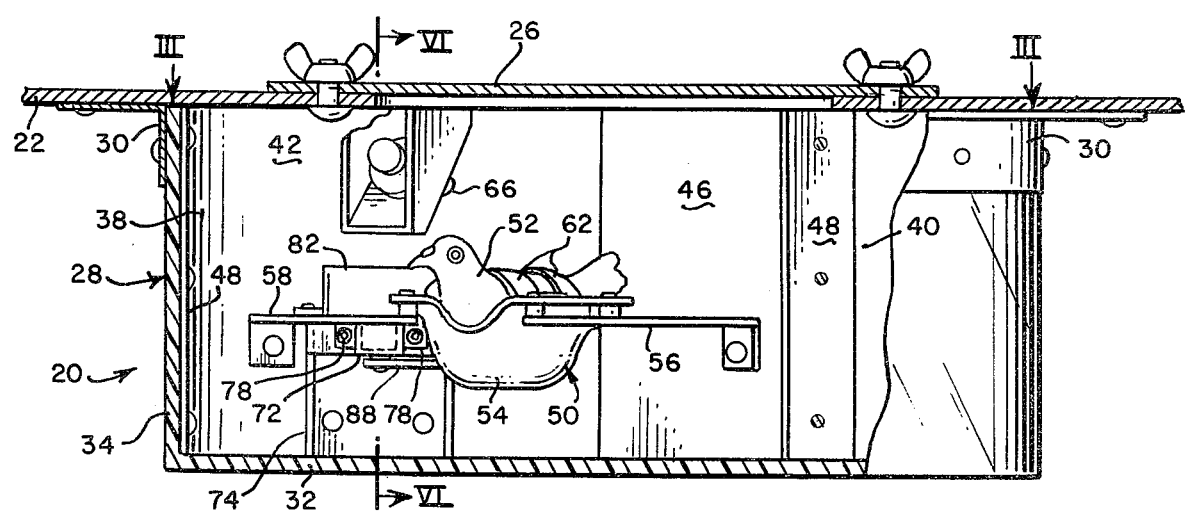
FIG. 2 is an elevation view of the search apparatus taken along plane II—II of FIG. 1.

Referring now to the drawings wherein like reference numerals designate like or similar parts throughout the several views, there is illustrated in FIG. 1 a search apparatus 20 which is mounted to the bottom of an aircraft, such as a helicopter 22 for locating a lost object on the earth's surface, such as a downed pilot 24 at sea. The search apparatus 20 can be mounted in a forward bottom portion or in a middle bottom portion of a helicopter depending upon the location of the helicopter's access cover plate 26, as illustrated in FIG. 2. The search apparatus 20 may include a transparent observation chamber 28 which may be connected to the bottom portion of the aircraft 22 by angular mounting plates 30. The observation chamber 28 may be constructed of plexiglass, and may include a bottom flat portion 32 which is connected to a ring portion 34. Alternatively, the observation 34 could be a bubble, such as a hollow hemisphere.

As illustrated in FIG. 3, the observation chamber 28 is divided into a plurality of compartments 36, 38, and 40 by a plurality of bulkheads 42, 44 and 46. It is preferred that three equally sized compartments be utilized in a 360° observation chamber, and that the bulkheads be opaque so that detection is optimized from each sector. Further, it is preferred that one of the bulkheads, such as bulkhead 42 illustrated in FIG. 3, be located in a foremost position of the chamber 28 with respect to the aircraft and be substantially within a vertical plane through the longitudinal axis of the aircraft. Each of the bulkheads 42, 44 and 46 may be joined at a central location within the observation chamber 28, and may be connected at their outer radial ends to the ring portion 34 of the chamber by brackets 48.

Figure 6:
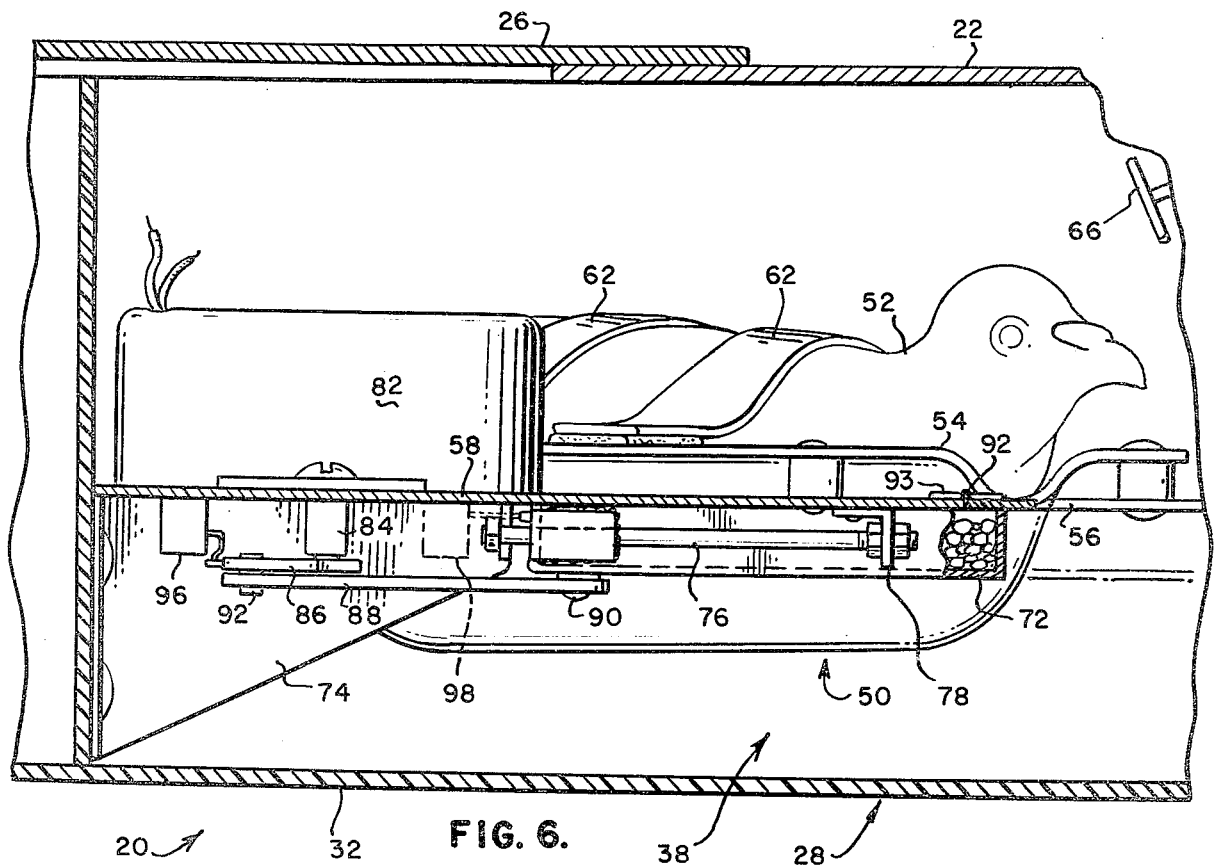
FIG. 6 is a view taken along plane VI—VI of FIG. 2.

As illustrated in FIGS. 2 through 7, a couch or cradle 50 may be mounted within each compartment for supporting a bird, such as a pigeon 52, with the head of the pigeon facing outwardly with respect to the observation chamber 28. As illustrated in FIGS. 2 and 6, the cradles 50 are positioned intermediate the height of the observation chamber so that there is provided bottom and top spacing. Further, as illustrated in FIG. 3, the cradles are positioned with a space between each cradle and the ring portion 34 of the chamber. As illustrated in FIG. 5, a cradle 50 may include an elongated arcuate support 54 which is connected in the aforementioned positions to respective bulkheads by gusset plates 56 and 58. These gusset plates are also spaced from the top and bottom of the chamber. Each arcuate member 54 of the cradle may be provided with padding 60 for the pigeon, and the pigeon may be held in place on the respective cradle by straps 62, these straps being secured at 64 by any suitable means such as Velcro.

A peck key 66 is mounted in each chamber 36, 38 and 40 in an outward and upward spaced position with respect to the outward end of a respective cradle 50. As illustrated in FIG. 6, the position of the peck key is located so that a pigeon may raise his head slightly and easily reach the key for pecking purposes. The peck key 66 is essentially a push-button switch which momentarily closes a circuit when the pigeon pecks thereon. An indicator, such as a light 68, may be electrically connected to each peck key 66 for the three pigeon embodiment. Three such lights 68 may be mounted within a respective 120° sector on the front face of a control panel 70 which may be mounted within the aircraft. Power (not shown) is provided to each connection between each respective peck key 66 and indicator light 68 so that when the peck key is depressed by a pigeon the corresponding light will be illuminated to indicate to an operator which pigeon is pecking the key.

As illustrated in FIGS. 2, 3, 4 and 6, a tray 72, which is adapted to contain food for the pigeon, is provided within each compartment 36, 38 and 40. Means are mounted within each compartment for sliding the respective tray outwardly or inwardly, the outward position being capable of presenting food to the pigeon and the inward position being capable of withdrawing food from the pigeon. The outward and inward positions are illustrated in FIGS. 4 and 5. The tray sliding means may include an angled support plate 74 which is connected to the bottom inward portion of each respective gusset plate 58. A pair of guide rods 76 may be connected to the forward end of each support plate along opposite sides of the tray 72. The forward ends of the rods 76 may be connected by an angle plate 78 to the bottom of the respective gusset 58. A pair of bearing blocks 80 may be mounted at the rear on each side of a respective tray 72 for receiving the guide rods 76 so as to enable the outward and inward movements of the tray within a respective compartment. Each tray sliding means further includes a reversible power means, such as a reversible motor 82, which may be mounted on the top of a respective gusset plate 58 with its output shaft 84 extending downwardly therethrough. As illustrated in FIGS. 4 and 6, a pair of lever arms 86 and 88 may be provided, the lever arm 86 being connected to the output shaft 84 of the motor, the lever arm 88 being pivoted to the bottom of a respective tray 72 at 90, and the lever arms being pivotally connected together at 91. With this arrangement the reversible rotations of the motor 82 will slide the respective tray 72 outwardly and inwardly. The outer end of the gusset plate 58 may be hinged at 92, and a spring 93 may be provided for closing the end against the food tray 72. With this arrangement the gusset end can be raised to facilitate filling the food tray 72, and should a pigeon get his beak caught between the gusset plate and the tray when the tray is being withdrawn, the gusset end will spring upwardly to allow the pigeon to remove his beak.

Figure 7:
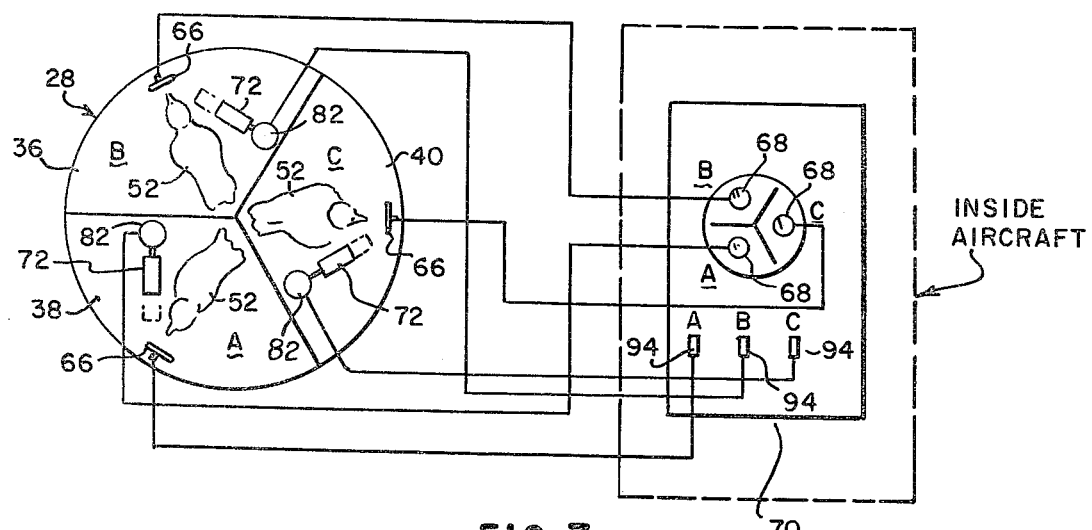
FIG. 7 is a schematic illustration of one embodiment of the electrical circuitry for the present invention.

Control means, such as a push button switch 94, may be electrically connected to each reversible motor 82 so that when the switch 94 is pushed the circuit is closed to actuate the respective motor. When a push button 94 is pushed the respective motor 82 will drive the respective tray 72 outwardly, and when the push-button 94 is released the motor will drive the tray 72 inwardly. The outward and inward movements of a tray 72 may be limited by a respective pair of limit switches 96 and 98 which may be mounted on a respective angled support bracket 74, as illustrated in FIG. 4. The limit switches would be interconnected in the circuit between a respective push button 94 and motor 82, the limit switch 96 being positioned to stop the rearward movement of the tray 72 when the lever arm 86 engages the switch in a rearward position and the switch 98 limiting the outward movement of the respective tray 72 when the lever arm 86 engages the limit switch 98 in a forward position, as illustrated in FIG. 4. As illustrated in FIG. 7, the push buttons 94 may be mounted on the control panel 70 for an operator's use within the aircraft.

Figure 8:
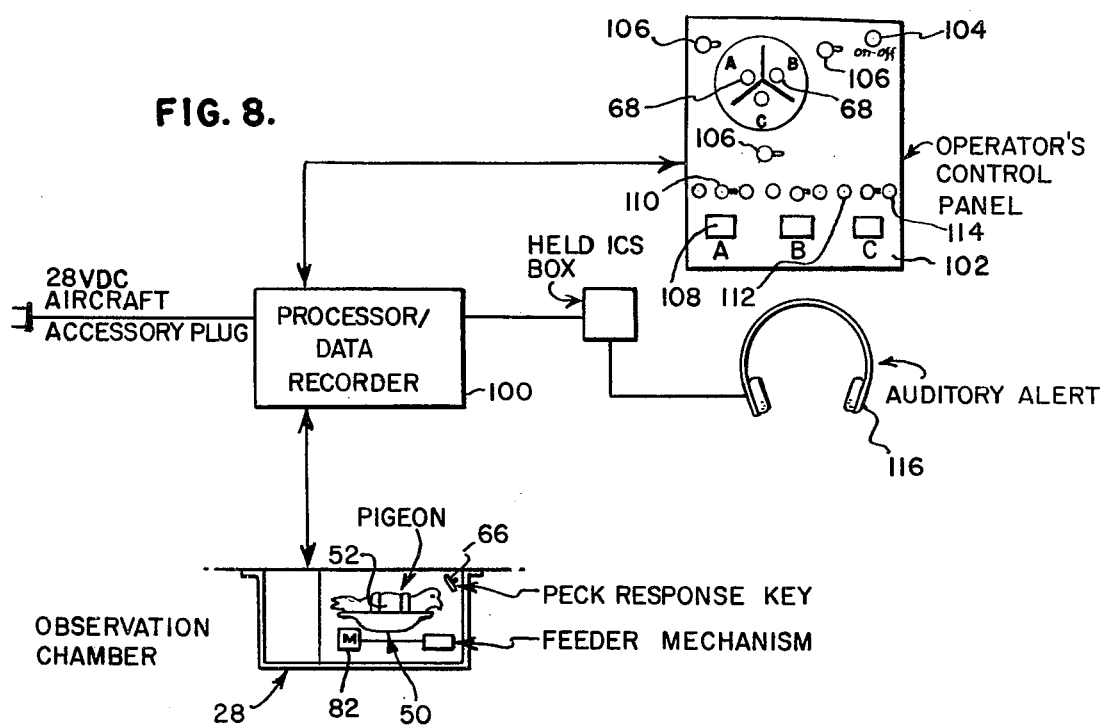
FIG. 8 is a schematic illustration of another embodiment of electrical circuitry for the present invention.
Figure 9:
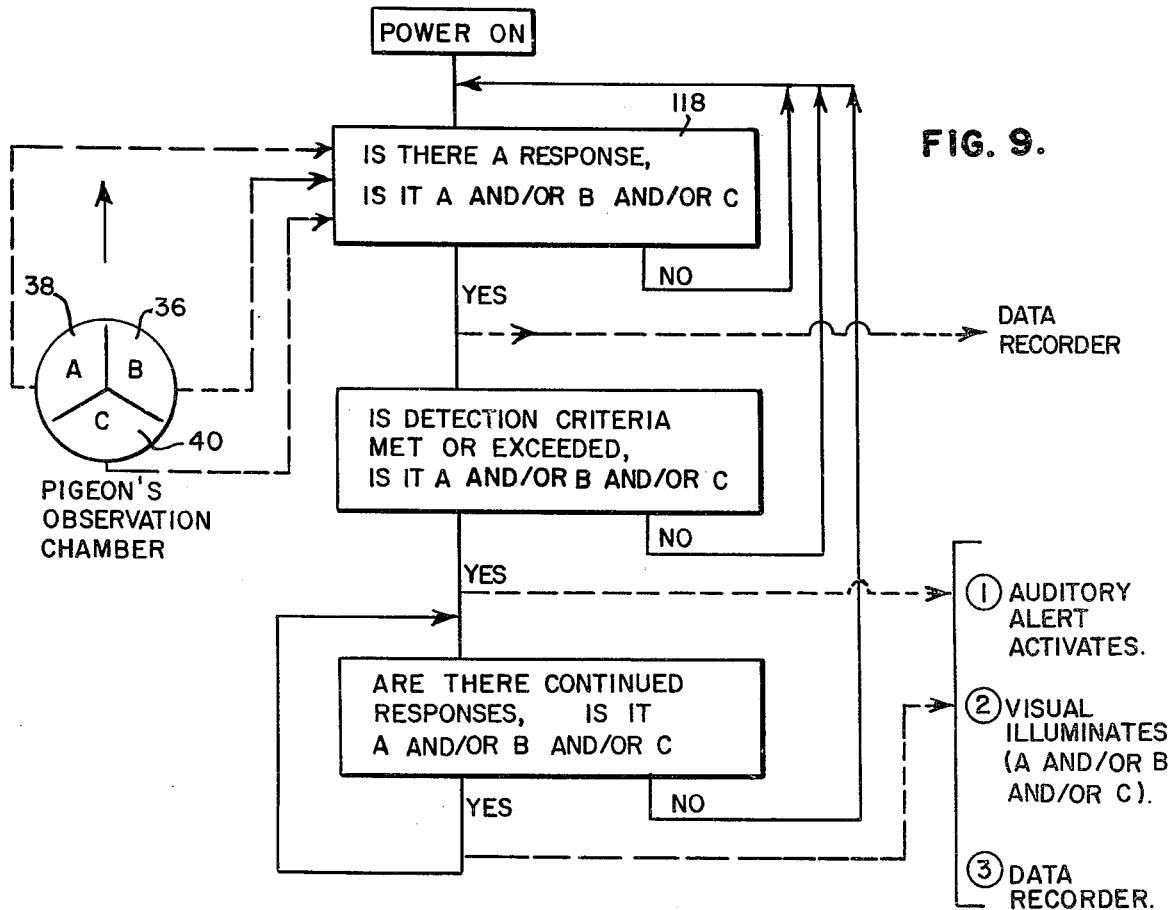
FIG. 9 is a block diagram of the logic which may be utilized for operating the search apparatus.

An additional degree of control may be obtained by an operator by utilizing the apparatus set forth in FIGS. 8, 9, and 10. In FIG. 8 all of the signals from the peck keys 66 are fed to a processor/data recorder unit 100, and the processed signals are sent from the unit 100 to a more elaborate control panel 102. Signals for operating the motors 82 of the feeder mechanisms and status signals representing the positions of the trays of the feeder mechanisms are sent via the processor/data recorder unit 100. Power for operating all of these functions may be obtained from the aircraft, and a switch 104 may be provided on the control panel 102 for switching the power on and off. FIG. 8 shows generally the control panel 102, FIG. 9 illustrates the logic functions desired from the operation of the control panel 102, and FIG. 10 illustrates the circuitry for the processor/data recorder unit 100 for one bird.

As illustrated in FIG. 8, the control panel 102 is similar to the control panel 70 in that status lights 68 are provided for representing the respective compartments 36, 38 and 40. Adjacent each status light 68 is a reset switch 106 which will be described in more detail hereinafter. At the bottom of the control panel are LCD counters 108 for representing the number of pecks by a bird in a respective compartment 36, 38, or 40. Just above the counters 108 are feeder switches 110 which operate in the same manner as the push button switches 94 of the panel 70. When a switch 110 is depressed a respective feeder tray 72 is moved outwardly for feeding the pigeon, and when the switch 110 is released the respective feeder tray is withdrawn. Lights 112 and 114 are provided on each side of a respective switch 110 for indicating the fully inward or fully outward positions respectively of a respective feeder tray. Below the control panel 102 is a headset 116 which is responsive to the processor/data recorder unit 100 for providing an auditory alert to the operator.

The desired logical operation of the processor/data recorder unit 100, control panel 102, and auditory alert 116 of FIG. 8 is illustrated in FIG. 9. When there is a response from a peck key from any of the compartments 36, 38, or 40 block 118 ensures that all of these pecks are recorded on a data recorder. If predetermined detection criteria are met or exceeded it is then desired that the operator be provided with an auditory alert on the headphone 116 and that the appropriate status light or status lights 68 be illuminated. In the particular embodiment constructed it was found desirable to require four to eight pecks by any particular bird within a four to seven second interval be utilized for establishing the detection criteria. For instance, if the detection criteria is that five pecks must be received within four seconds, such criteria must be met before there are auditory and visual indications to the operator. The meeting or exceeding of such criteria also records certain data on the data recorder. If there are continued responses for a predetermined period of time after the detection criteria is met or exceeded each response or pecking of a key will provide auditory, visual, and recorder indications. In the preferred embodiment the predetermined period of time for continued responses could be set at 20, 30, or 40 seconds.

A portion of the circuitry for the processor/data recorder 100 is illustrated in FIG. 10. FIG. 10 illustrates the circuitry for only one compartment, which means that each compartment 36, 38, and 40 has a respective set of circuitry as illustrated in FIG. 10, with the exception of a common earphone 116 and data recorder 124 which is part of the processor/data recorder unit 100. As illustrated in FIG. 10, if a bird pecks the plate 66 there is an output signal to a pulse shaper 126 which merely lengthens and shapes the pulse for operating the remainder of the circuitry. The pulse shaper 126 outputs to a counter 128 and to the data recorder 124, the latter recording each peck made by a particular bird. The counter 128 sequentially counts pulses one through four, and upon receiving the increased counts provides corresponding outputs to timers 130, 132, 134, and 136 for starting a timing function. The timer 130 has a feedback loop 138 to the counter 128 for recycling the counter 128 after the timed function of timer 130. Each timer 130, 132, 134, and 136 outputs to a respective counter 140, 142, 144, and 146. Each of the counters in turn outputs to an OR-gate 148 when a predetermined count has been obtained. Each of the counters receives all of the peck responses from the counter 128 via the line 150. A plurality of timer and counter combinations are required because of the erratic pecking behavior of the pigeons utilized in the preferred embodiment. For instance, the pigeon may peck once, which will activate timer 130 and counter 140. The pigeon may peck a couple more times within the interval of timer 130 but not enough to cause the counter 140 to output to the OR-gate 148. However, the timer 132 will have become subsequently activated, and the required number of peck responses, such as five, will be picked up by the counter 142 and an output will go to the OR-gate 148. Accordingly, the timer and counter combinations ensure that when the detection criteria of FIG. 9 is met during the set time interval that it will cause a response to the OR-gate 148 regardless of the erratic pecking.

The counter 128 also outputs to a respective LCD counter 108 and a pulser 151. The pulser 151 receives each peck response from a respective compartment 36, 38, or 40. When the OR-gate 148 has received a response, it will output to a pulser 152 and a flip-flop latch 154. In the preferred embodiment the pulser 152 provides a four second pulse to the data recorder 124 to indicate that the detection criteria of FIG. 9 had been met. The outputting of the OR-gate 148 to the latch 154 causes the latch to turn on and stay on until reset by a timer and pulser combination 156 and 158 respectively. When the latch 154 is on it outputs to an auditory/visual relay 160 by turning this relay on. The pulser 151 shapes the pulses from the counter 128 and feeds them to the relay 160 where they are passed to the headphone 116 as well as a respective visual detection light 68 on the control panel 102. The relay 160 also outputs to the timer 156 which, in the preferred embodiment, can be set at 20, 30, or 40 seconds. This time is reset at zero, each time there is a response after the detection criteria has been met. Once the set time interval of timer 156 has expired a signal is sent to the pulser 158 which shapes a pulse and provides an output to the latch 154 for resetting the latch. A resetting of the latch 154 stops the output to the relay 160 which causes all indications to terminate until such time that the detection criteria of FIG. 9 is once again met or exceeded. This can be manually accomplished by the operator by pressing a respective reset key 106 on the control panel 102 of FIG. 8.

In the preferred embodiment the pigeons were trained to peck the respective plate 66 when they saw a particular color. In the preferred embodiment the training was for the color orange. With this training and the system described hereinabove the probability of detection by the pigeons was 97 percent as compared to 38 percent for crewman under the same conditions in a helicopter flying over the ocean.

Obviously, many modifications and variations of the present invention are possible in the light of the above teachings, and, it is therefore understood that within the scope of the disclosed inventive concept, the invention may be practiced otherwise than specifically described.

What is claimed is:

1. A search apparatus for an aircraft comprising:
    a closed observation chamber mounted to the bottom of the aircraft so as to extend downwardly therefrom;
    said chamber including a bottom portion and being transparent entirely about a horizontal plane with respect to the axes of the aircraft so as to enable a view 360° in said horizontal plane and also through said bottom portion; and
    a plurality of bulkheads dividing the chamber into at least three closed compartments which includes support means therein, and each bulkhead forming a vertical plane with respect to the axes of the aircraft so that each chamber has a partial view with respect to said horizontal plane and through said bottom portion.

2. A search apparatus as claimed in claim 1 including:
    said chamber being circular as seen in said horizontal plane; and
    one of the bulkheads being located in a foremost position of the chamber with respect to the aircraft and being located substantially within a vertical plane through the longitudinal axis of the aircraft.

3. A search apparatus as claimed in claim 2 including:
    a cradle mounted within each compartment for supporting a bird with the head of the bird facing outwardly with respect to the chamber; and
    a peck key mounted in each compartment in proximity to the outward end of the cradle.

4. A search apparatus as claimed in claim 3 including:
    a plurality of indicators mounted within the aircraft; and
    each peck key being connected to a respective indicator.

5. A search apparatus as claimed in claim 4 including:
a tray which is adapted to contain food for the bird; and
means mounted within each compartment for sliding the tray outwardly or inwardly, the outward position being capable of presenting food to the bird and the inward position being capable of withdrawing food from the bird.

6. A search apparatus as claimed in claim 5 including:
each tray sliding means including a reversible power means; and
control means connected to each reversible power means and mounted in the aircraft for selectively actuating each power means so that each food tray can be selectively slid outwardly or inwardly.

7. A search apparatus for an aircraft comprising:
a detachable closed transparent observation chamber means having a bottom, said observation chamber being mountable to the bottom of the aircraft so as to extend downwardly therefrom for providing a 360° view in a horizontal plane and downwardly through said bottom with respect to the axes of the aircraft;
a plurality of opaque vertical bulkheads dividing the chamber into a plurality of compartments so that each compartment has a partial view in said horizontal plane;
a cradle mounted within each compartment for supporting a bird with the head of the bird facing outwardly with respect to the chamber;
a peck key mounted in each compartment in proximity to the outward end of the cradle;
a tray adapted to contain food for the bird; and
means mounted within each compartment for sliding the tray inwardly or outwardly, the outward position being adapted to present food to the bird and the inward position being adapted to withdraw food from the bird.

8. A search apparatus as claimed in claim 7 including:
a plurality of indicators; and
each peck key being connected to a respective indicator.

9. A search apparatus as claimed in claim 8 including:
each tray sliding means including a reversible power means; and
control means connected to each reversible power means for selectively actuating each power means so that each food tray can be selectively slid outwardly or inwardly.

10. A search apparatus as claimed in claim 9 including:
said observation chamber being circular as seen in a horizontal plane; and
said bulkheads dividing the chamber into at least three equally sized compartments as seen in said horizontal plane.

11. A search apparatus comprising:
an aircraft;
a transparent observation chamber having a bottom mounted on the bottom of the aircraft, said chamber being circular as seen in a horizontal plane;
a plurality of opaque bulkheads dividing the chamber into at least three equally sized viewing compartments as seen in said horizontal plane;
one of the bulkheads being located in a foremost position of the chamber with respect to the aircraft and being substantially aligned with the longitudinal axis of the aircraft;
a cradle mounted within each compartment for supporting a bird with the head of the bird facing outwardly with respect to the viewing compartment;
a peck key mounted in each compartment in proximity to the outward end of the cradle;
a tray adapted to contain food for the bird;
means including reversible power means mounted within each compartment for sliding the tray inwardly or outwardly, the outward position being adapted to present food to the bird and the inward position being adapted to withdraw food from the bird;
control means connected to each reversible power means for selectively actuating each power means so that each food tray can be selectively slid outwardly or inwardly;
a plurality of indicators;
each peck key being connected to a respective indicator; and
the peck key indicators and the control means for the food tray power means being mounted inside the aircraft.

12. A search apparatus as claimed in claim 11 including:
a bird mounted in each compartment.

13. A search apparatus as claimed in claim 12 including:
processor means interconnected between the peck keys and the indicators for enabling any indicator only when a predetermined number of pecks has been made on a respective peck key within a predetermined interval of time; and
said processor means activating any indicator each time a respective peck key has been pecked over another predetermined interval of time after the indicator has been enabled.

* * * * *